United States Patent
Akimoto

(10) Patent No.: US 6,278,529 B1
(45) Date of Patent: *Aug. 21, 2001

(54) COLOR COMMUNICATION APPARATUS AND METHOD THEREOF AND STORAGE MEDIUM FOR STORING SAID METHOD

(75) Inventor: Naoto Akimoto, Sagamihara (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/698,328

(22) Filed: Aug. 14, 1996

(30) Foreign Application Priority Data

Aug. 17, 1995 (JP) ................................. 7-232009

(51) Int. Cl.[7] .............................. G06F 15/00; H04N 1/00
(52) U.S. Cl. ........................................... 358/1.9; 358/434
(58) Field of Search .................................... 358/500, 434, 358/436, 442, 444, 405, 501, 530, 524, 527, 540, 400, 1.9, 1.15, 1.13, 1.6, 505; 382/162

(56) References Cited

U.S. PATENT DOCUMENTS

| | | | |
|---|---|---|---|
| 4,739,397 | * 4/1988 | Hayashi | 358/80 |
| 5,220,417 | 6/1993 | Sugiura | 358/500 |
| 5,321,517 | * 6/1994 | Takei et al. | 358/310 |
| 5,361,143 | * 11/1994 | Nakayama et al. | 358/500 |
| 5,363,219 | 11/1994 | Yoshida | 358/539 |
| 5,483,358 | 1/1996 | Sugiura et al. | 358/508 |
| 5,485,283 | * 1/1996 | Kaneko | 358/518 |
| 5,523,860 | * 6/1996 | Takei et al. | 358/444 |
| 5,666,216 | * 9/1997 | Sugiura | 358/500 |
| 5,696,598 | * 12/1997 | Yoshida et al. | 358/434 |
| 5,774,654 | * 6/1998 | Maki | 395/200.3 |
| 5,859,711 | * 1/1999 | Barry et al. | 358/296 |

FOREIGN PATENT DOCUMENTS

| | | |
|---|---|---|
| 402228680A | * 9/1990 | (JP) . |
| 5-64018 | 3/1993 | (JP) . |
| 2952232 | 9/1998 | (JP) . |

* cited by examiner

Primary Examiner—Madeleine Nguyen
(74) Attorney, Agent, or Firm—Fitzpatrick, Cella, Harper & Scinto

(57) ABSTRACT

A color communication apparatus is capable of directly transmitting color image data and monochrome image data to a partner's device. To this end, the apparatus includes a key for designating either one of a first mode for transmitting an original as a color image and a second mode for transmitting the original as a monochrome image, and furthermore discriminates, before the original is read, whether or not the partner's device can receive the color image. Then the apparatus selectively performs one of two operations on the basis of the designated mode and the discrimination result, one operation being a first direct transmission operation to read the original as the color image to generate color image data and to transmit the color image data to the partner's device, and the other operation being a second direct transmission operation to read the original as the monochrome image, in a reading process different from reading the original as a color image, to generate monochrome image data and to transmit the monochrome image data to the partner's device.

6 Claims, 13 Drawing Sheets

FIG. 9

'94 07/01 FRI 10 : 22
PAGE1

IN COLOR TRANSMISSION

FIG. 10A

'94 07/01 FRI 10 : 24
PAGE5

IN BLACK/WHITE TRANSMISSION

FIG. 10B

'94 07/01 FRI 10 : 25
PAGE7

COLOR ORIGINAL BEING IN
BLACK/WHITE TRANSMISSION

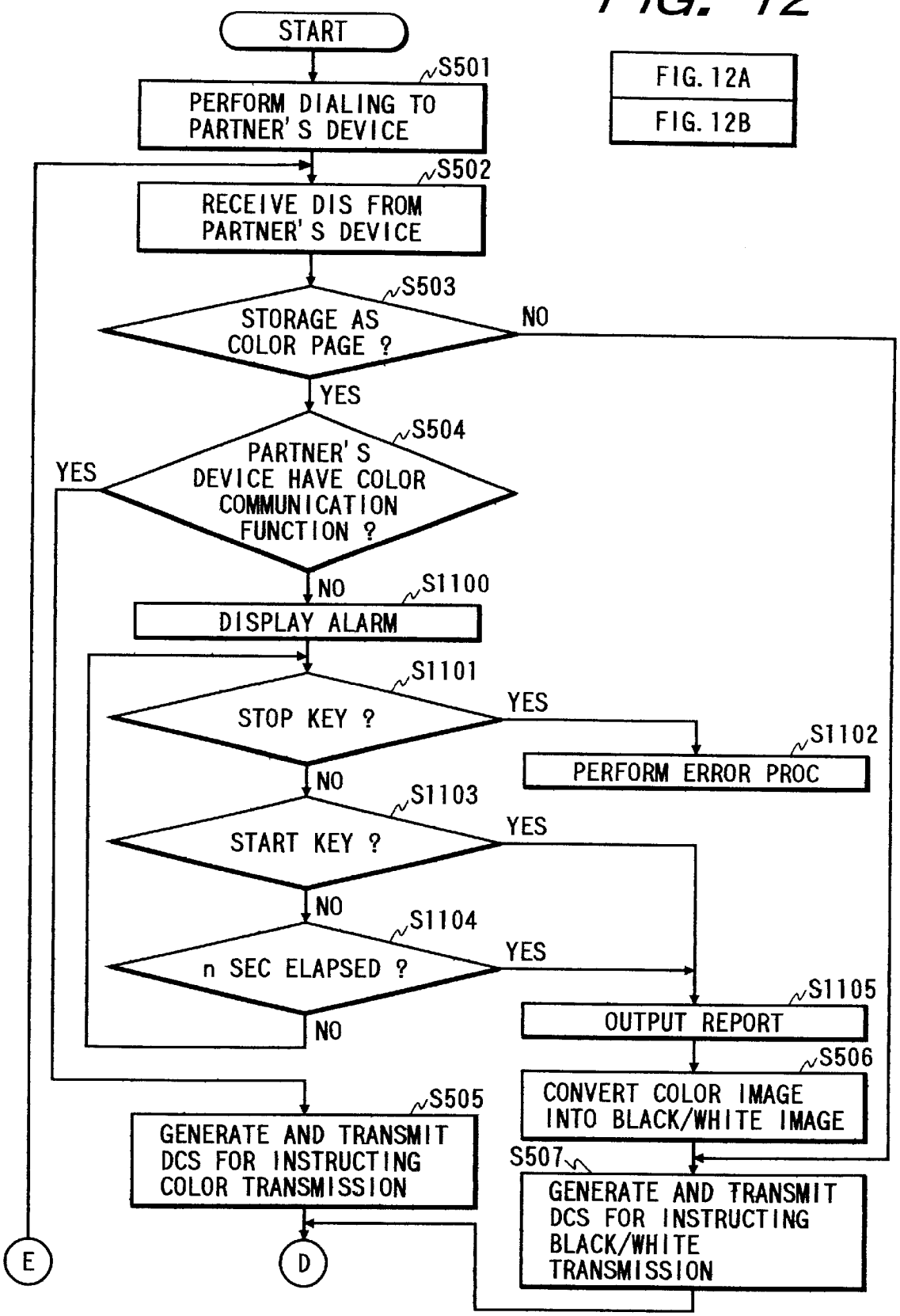

COLOR COMMUNICATION APPARATUS AND METHOD THEREOF AND STORAGE MEDIUM FOR STORING SAID METHOD

BACKGROUND OF THE INVENTION

1. Field of the Invention

The present invention relates to a color communication apparatus and a color communication method which communicate color image data, and a storage medium which stores the color communication method.

2. Related Background Art

Conventionally, it has been known to use a color communication apparatus which has a color scanner and a color printer to perform a communication with a partner's device. In the apparatus, an original to be transmitted is read as a color image by the color scanner, and obtained color image data is stored in a memory. Then, if the partner's device has a color communication function, the apparatus transmits the color image data. On the other hand, if the partner's device does not have the color communication function, the apparatus converts the color image data into monochrome (black-and-white) image data and then transmits the converted monochrome image data.

However, in an above conventional communication procedure, in a case where the partner's device cannot receive the color image data, it must be performed a wasteful image process must be performed in which a large amount of color image data is first stored in the memory and the stored data is then transmitted.

Further, in the above conventional procedure, if a transmission instruction in a color transmission mode is performed to transmit the original as the color image but the original is automatically transmitted as a monochrome image because of some reason such as, e.g., the partner's device cannot perform a color communication, an operator will erroneously believe that the original was transmitted as the color image. Therefore, the original which is intended to be transmitted by the operator cannot always be transmitted.

SUMMARY OF THE INVENTION

An object of the present invention is to entirely or individually solve the above conventional problems.

Another object of the present invention is to eliminate, in a case where an original is intended to be transmitted as a color image, a wasteful image data process if a partner's device cannot receive the color image due to some problem.

In order to achieve the above objects, according to one preferred embodiment of the present invention, there can be provided a color communication apparatus capable of transmitting color image data and monochrome image data to the partner's device, comprising:

designation means for designating either one of a first mode for transmitting an original as a color image and a second mode for transmitting the original as a monochrome (black/white) image;

discrimination means for discriminating whether or not the partner's device can receive the color image data;

image data generation means for selectively performing one of two operations on the basis of the mode designated by the designation means and a discrimination result by the discrimination means, one operation being to read the original as the color image to generate the color image data, and the other operation being to read the original as the monochrome image to generate the monochrome image data; and transmission means for transmitting the image data generated by the data generation means to the partner's device.

Still another object of the present invention is that, in a case where an original is transmitted as a color image, even if such a color original must be transmitted as a monochrome (black/white) image because of some reason at a partner's device side, an operator can certainly know a transmission result.

In order to achieve the above object, according to one preferred embodiment of the present invention, there can be provided a color communication apparatus capable of transmitting color image data and monochrome image data to a partner's device, comprising:

designation means for designating either one of a first mode for transmitting the original as a color image and a second mode for transmitting the original as the monochrome image;

discrimination means for discriminating whether or not the partner's device can receive the color image data;

generation means for generating the color image data or the monochrome image data in accordance with the mode designated by the designation means and a discrimination result by the discrimination means;

transmission means for transmitting the color image data or the monochrome image data generated by the generation means; and display means for displaying that the original is transmitted as the monochrome image, in a case where the transmission means transmits the original as the monochrome image data even though the first mode has been designated by the designation means.

Still another object of the present invention is to eliminate, in a case where a color original is intended to be transmitted as a color image, an operation in which the original to be transmitted within one communication is read plural times for each page and then transmitted, even if a partner's device does not have a color reception function.

In order to achieve the above object, according to one preferred embodiment of the present invention, there can be provided a color communication apparatus capable of transmitting color image data and monochrome (black/white) image data to the partner's device, comprising:

designation means for designating, for each page, either one of a first mode for transmitting the original as the color image and a second mode for transmitting the original as a monochrome image;

discrimination means for discriminating whether or not the partner's device can receive the color image data;

image data generation means for selectively performing one of two operations on the basis of the mode designated by the designation means and a discrimination result by the discrimination means, one operation being to read the original as the color image to generate the color image data, and the other operation being to read the original as the monochrome image to generate the monochrome image data; and transmission means for transmitting the image data generated by the image data generation means to the partner's device.

Still another object of the present invention is to provide a color communication apparatus and a color communication method which have a new function, and a storage medium which stores the color communication method.

The above and other objects of the present invention will be apparent from the following embodiments and the attached drawings.

BRIEF DESCRIPTION OF THE DRAWINGS

FIG. 9 is a view showing an example of a displayed content in the one embodiment;

FIGS. 10A and 10B are views showing examples of displayed contents in the one embodiment;

DETAILED DESCRIPTION OF THE PREFERRED EMBODIMENT

Figure 1:
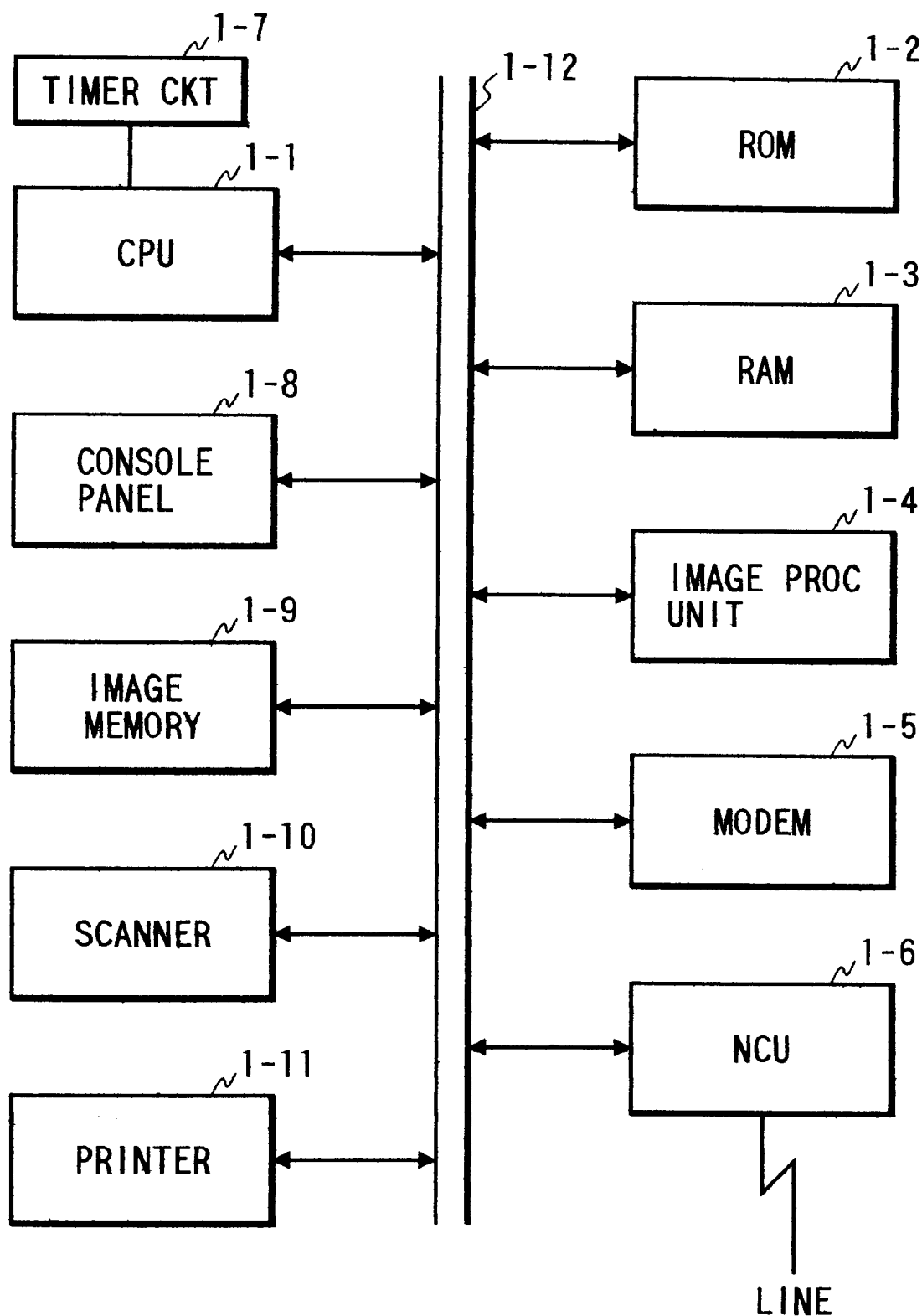
FIG. 1 is a block diagram showing one embodiment of the present invention.

FIG. 1 is a block diagram showing an example of a configuration of a color communication apparatus.

In the present embodiment, a facsimile apparatus has a G3 facsimile function and a transmission/reception function of a color image, and is connected to an analog telephone line to be used.

A central process unit (CPU) 1-1 entirely controls the facsimile apparatus via a CPU bus 1-12. A read-only-memory (ROM) 1-2 is used as a program memory. A random-access-memory (RAM) 1-3 is a work memory which appropriately stores various kinds of data, and is backed up by a battery such that stored contents do not volatilize.

An image process unit 1-4 has an encoder which encodes a binary signal in a Modified Huffman (MH) encode method, and an MH decoder which decodes MH encoded data into the binary signal to be output. Further, the image process unit 1-4 has an encoder and color conversion circuit which inputs a color component signal such as an RGB (Red, Green, Blue) component signal or the like, as a multivalue signal having eight bits for each pixel, converts the multivalue signal into L*a*b* signal components, and then performs a JPEG (Joint Photographic Expert Group) base-line encode. Furthermore, the image process unit 1-4 has a JPEG decoder and color conversion circuit which decodes the JPEG base-line encoded data to obtain eight-bit multivalue data for each of L*a*b* components, and thereafter converts the L*a*b* components into CMYK components to be output.

A modem unit 1-5 modulates and demodulates transmission and reception signals. A network control unit (NCU) 1-6 controls a connection between the facsimile apparatus to a telephone network. A timer unit 1-7 consists of a timer LSI having a calendar function, and the like. A console panel 1-8 has various input keys and a liquid crystal display (LCD). An image memory 1-9 consists of semiconductor memories and is controlled to store image data in units of a page.

A color scanner 1-10 optically reads an original, divides it into RGB components, and then outputs a each color component for each pixel as eight-bit multivalue data. The color scanner 1-10 also has an auto-document feeder (ADF) mechanism. A printer unit 1-11 converts, in a case where multivalue data for each of CMYK components is input, each color data into binary data to perform a color print. On the other hand, the printer unit 1-11 performs a black/white (monochrome) print in a case where binary data is input.

Figure 2:
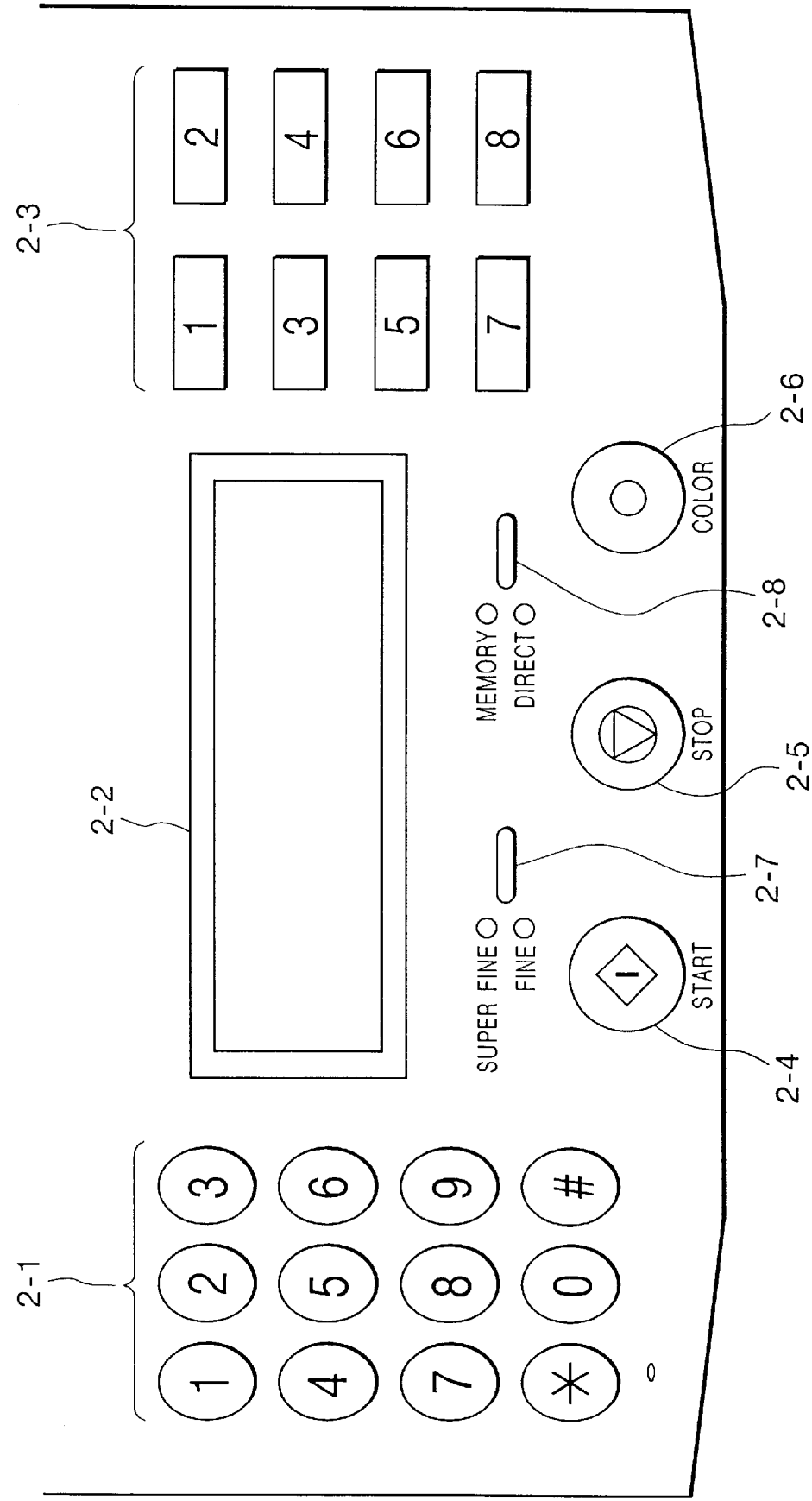
FIG. 2 is an outer view of a console panel in the one embodiment.

FIG. 2 is an outer view of the console panel 1-8 in the present embodiment.

A ten key 2-1 consists of 12 kinds of keys, i.e., "0" to "9" keys, a "#" key and a "*" key, and is mainly utilized as an input means to input a telephone number.

An LCD (liquid crystal display) unit 2-2 displays a state of the facsimile apparatus, communication information and information to be used for confirming the input of the telephone number.

A one touch key 2-3 is used in a case where a destination number or the like previously stored in the RAM 1-3 is read to be one-touch transmitted. A start key 2-4 is -used to start various operations such as a transmission and the like. A stop key 2-5 is used to stop the various operations.

A color key 2-6 is used to read the original as a color original. For example, if there is an original having four pages and its third page is a color page, when the color key 2-6 is depressed during its second page is read, it is instructed that a page to be next read is the color page. A lamp is provided inside the color key 2-6, so that the lamp repeatedly turns on and off every time the color key 2-6 is depressed. When one page is being read, the lamp can be recognized. The original is stored as the color original when the lamp is turned on. On the other hand, the original is stored as a black/white (monochrome) original when the lamp is turned off.

A resolution selection key 2-7 is used to change a resolution in case of reading the original. That is, every time the key 2-7 is depressed, a mode change is performed among three modes, i.e., a standard mode (the lamp is turned off), a fine mode (the lamp next to a character "FINE" is turned on) and a super fine mode (the lamp next to a character "SUPER FINE" is turned on).

A transmission mode switch key 2-8 is used to change transmission modes. That is, every time the key 2-8 is depressed, a mode change is performed between two transmission modes i.e., a memory transmission mode (the lamp next to a character "MEMORY" is turned on) and a direct transmission mode (the lamp next to a character "DIRECT" is turned on). In the memory transmission mode, the original is entirely stored in a memory and then transmitted, while in the direct transmission mode, the original is transmitted as it is read.

In the present invention, although the display is performed by using the two lamps respectively indicating a memory transmission and a direct transmission, there may be provided a single lamp. In this case, one transmission (e.g., the memory transmission) is considered as "default", and the lamp is turned on only in the other transmission (e.g., the direct transmission).

Figure 3:
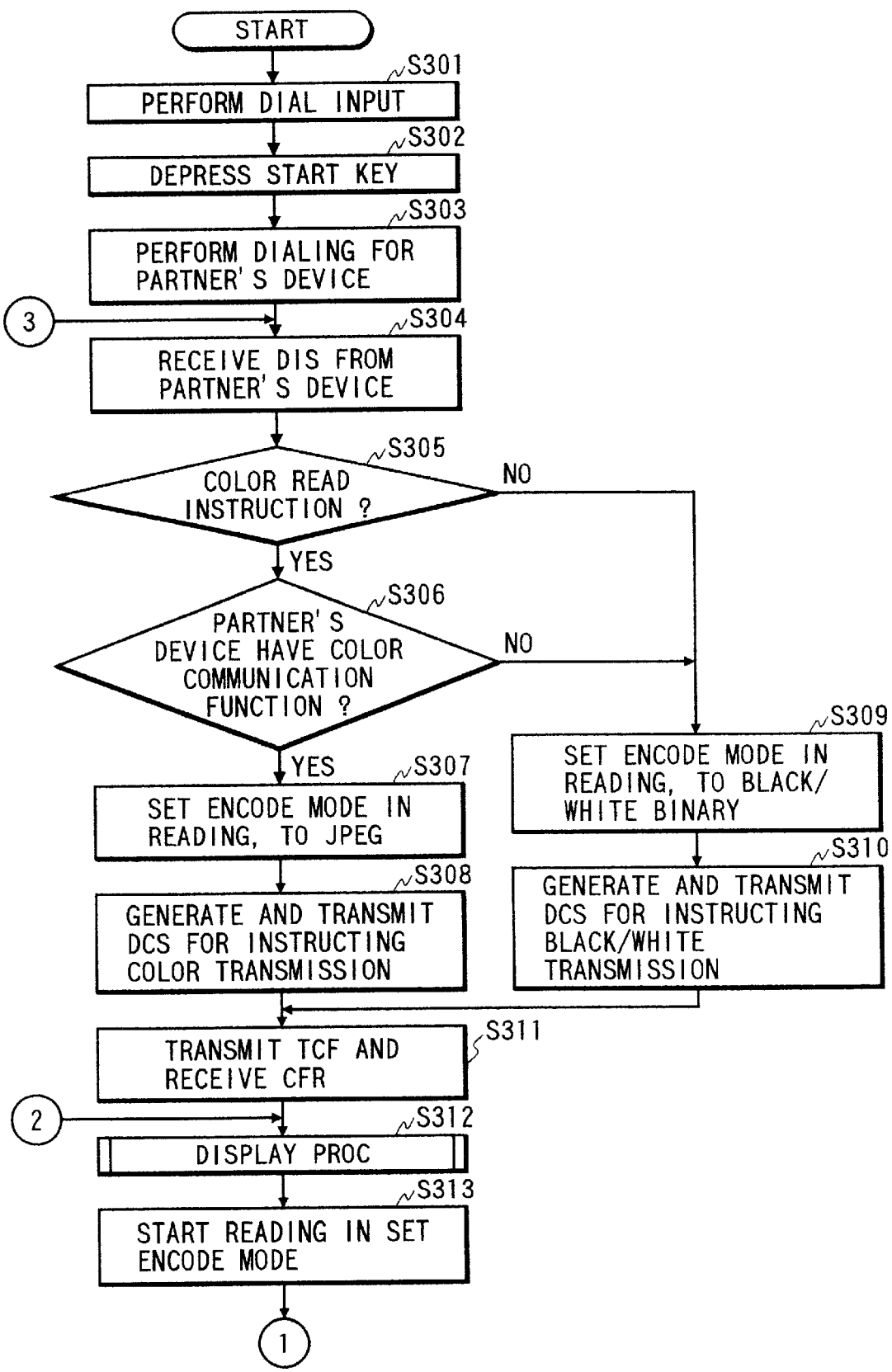
FIG. 3 is a flow chart showing an operation of a direct transmission in the one embodiment.
Figure 4:
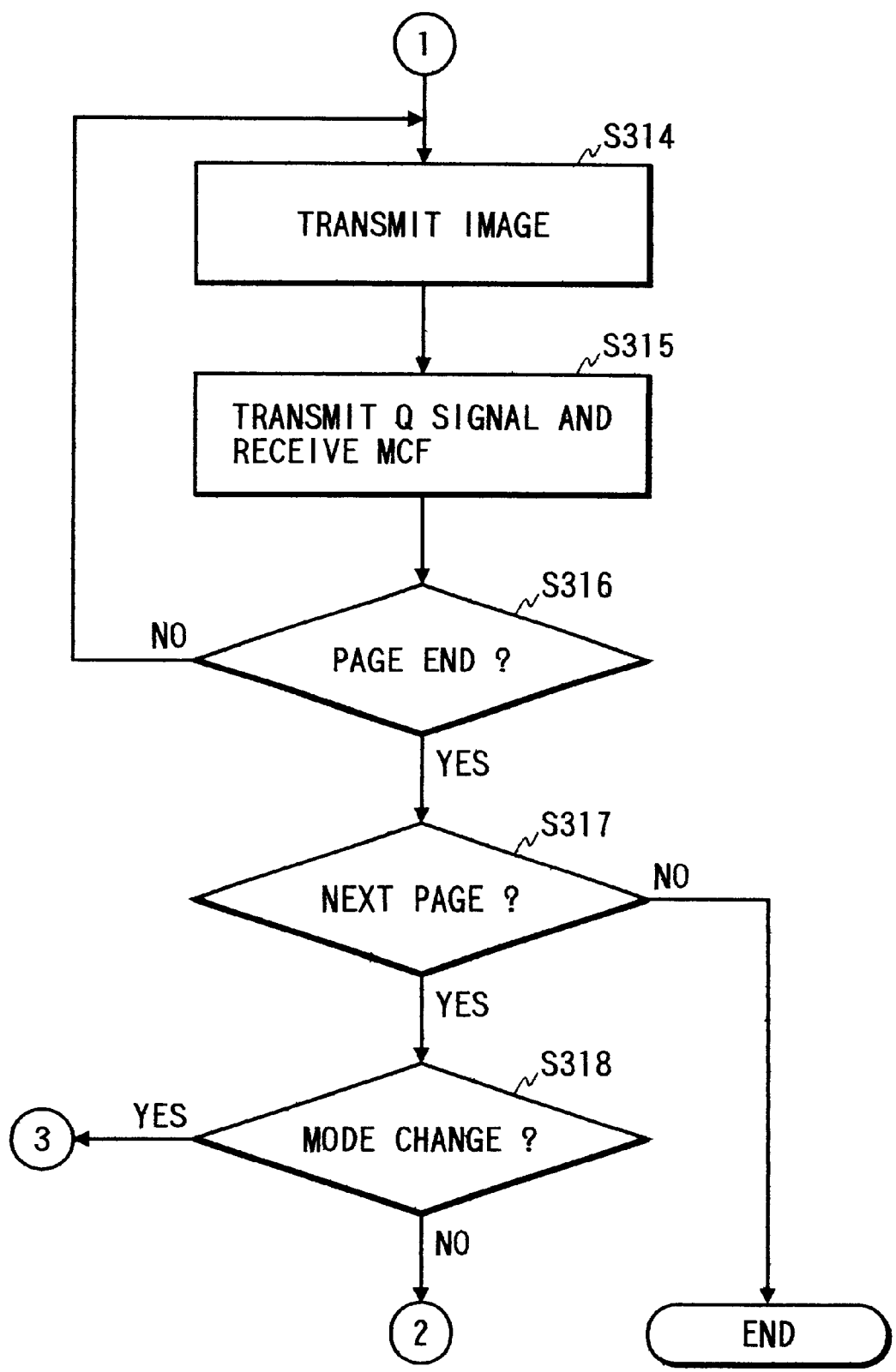
FIG. 4 is a flow chart showing the operation of the direct transmission in the one embodiment.

FIGS. 3 and 4 are flow charts showing an operation of the direct transmission in the present embodiment.

In a step S301, the transmission mode is set as the direct transmission by operating the transmission mode switch key 2-8. Successively, the original is placed on an original support plate, and a telephone number of a communication partner is input by means of the ten key 2-1 or the one touch key 2-3.

In a step S302, the start key 2-4 is depressed to instruct a transmission start. If the communication partner is designated by means of the one touch key 2-3, the operation in the step S302 is unnecessary. Then, in a step S303, a dialing is performed to a partner's device via the modem unit 1-5 and the NCU 1-6.

In a step S304, a digital identification signal (DIS) is received from the partner's device. The DIS includes information representing a function of the partner's device. In this case, the function includes a function as to whether or not the partner's device can perform a color communication.

In a step S305, it is checked whether or not the lamp in the color key 2-6 was turned on by depressing the key 2-6. Namely, it is checked whether or not an operator instructs to read the original as the color original.

If it is not instructed to read the original as the color original in the step S305, the original should be read as the black/white (monochrome) original. Therefore, an encode mode when reading the original is set as a black/white (monochrome) binary mode in a step S309.

On the other hand, if it is instructed to read the original as the color original in the step S305, it is checked in a step S306 whether or not the DIS received in the step S304 includes a declaration that the partner's device has the color communication function. If there is no declaration, the color original cannot be transmitted. Therefore, the encode mode when reading the original is set as the black/white binary mode in the step S309, to transmit the original as the black/white original.

After the encode mode is set as the black/white binary mode in the step S309, a digital command signal (DCS) for instructing the black/white transmission is generated and transmitted in a step S310.

If it is judged in the step S306 that the partner's device has the color communication function, the color communication can be performed. Therefore, the encode mode when reading the original is set as a JPEG mode in a step S307. Successively, the DCS for instructing the color transmission is generated and transmitted in a step S308.

After transmitting the DCS in the step S308 or S310, a training check (TCF) is transmitted in a step S311. Then, if the partner's device can correctly or normally receive the TCF, a confirmation to receive (CFR) is received from the partner's device. The signal transmission/reception to/from the partner's device is performed according to a communication control program in the ROM 1-2.

Then, the various information set in the above manner are displayed in a step S312. In a step S313, the reading of original starts in the encode mode set in the step S307 or S309. In this case, if the color reading is instructed and the partner's device can perform the color communication, the original is read in the JPEG encode mode. On the other hand, if the color reading is instructed but the partner's device cannot perform the color communication, or if the black/white reading is originally instructed, the original is read in the black/white binary mode.

In a step S314 in FIG. 4, the encoded image data is transmitted. In this case, if an error correction mode (ECM) procedure in T.30 is used, the data of 64 Kbyte can be transmitted. When the transmission of image data terminates, a Q signal is transmitted in a step S315. If the image data transmitted in the step S314 has been correctly received, the partner's device transmits a message confirmation (MCF) and a transmission side, i.e., the facsimile apparatus, receives the MCF.

It is checked in a step S316 whether or not the image corresponding to one page is entirely transmitted. If not, the flow returns to the step S314 to perform the transmission process of the remaining image. On the other hand, if yes, it is checked in a step S317 whether or not remains of the original are being placed on the original support plate, so as to check whether or not there is a next page to be transmitted.

If it is judged there is no next page, the process terminates. On the other hand, if it is judged there is the next page, it is checked in a step S318 whether or not a mode change is instructed. In this case, it is meant by the mode change that the transmission mode (i.e., a resolution, a paper size, a color/monochrome or the like) for the just-transmitted page is changed to that for the next-transmitted page. For example, if the color key 2-6 and/or the resolution selection key 2-7 are depressed to change the mode before reading the next page of the original, the mode used in the transmission of the next page is reset.

If the mode change is performed in the step S318, the flow returns to the step S304 to receive the DIS from the partner's device. On the other hand, if the mode change is not performed, the flow returns to the step S312 to transmit the data of the next page. In case of transmitting the second and following pages, the information concerning the function of the partner's device which information has been obtained in the transmission of the first page may be utilized without receiving the DIS from the partner's device.

Figure 5:
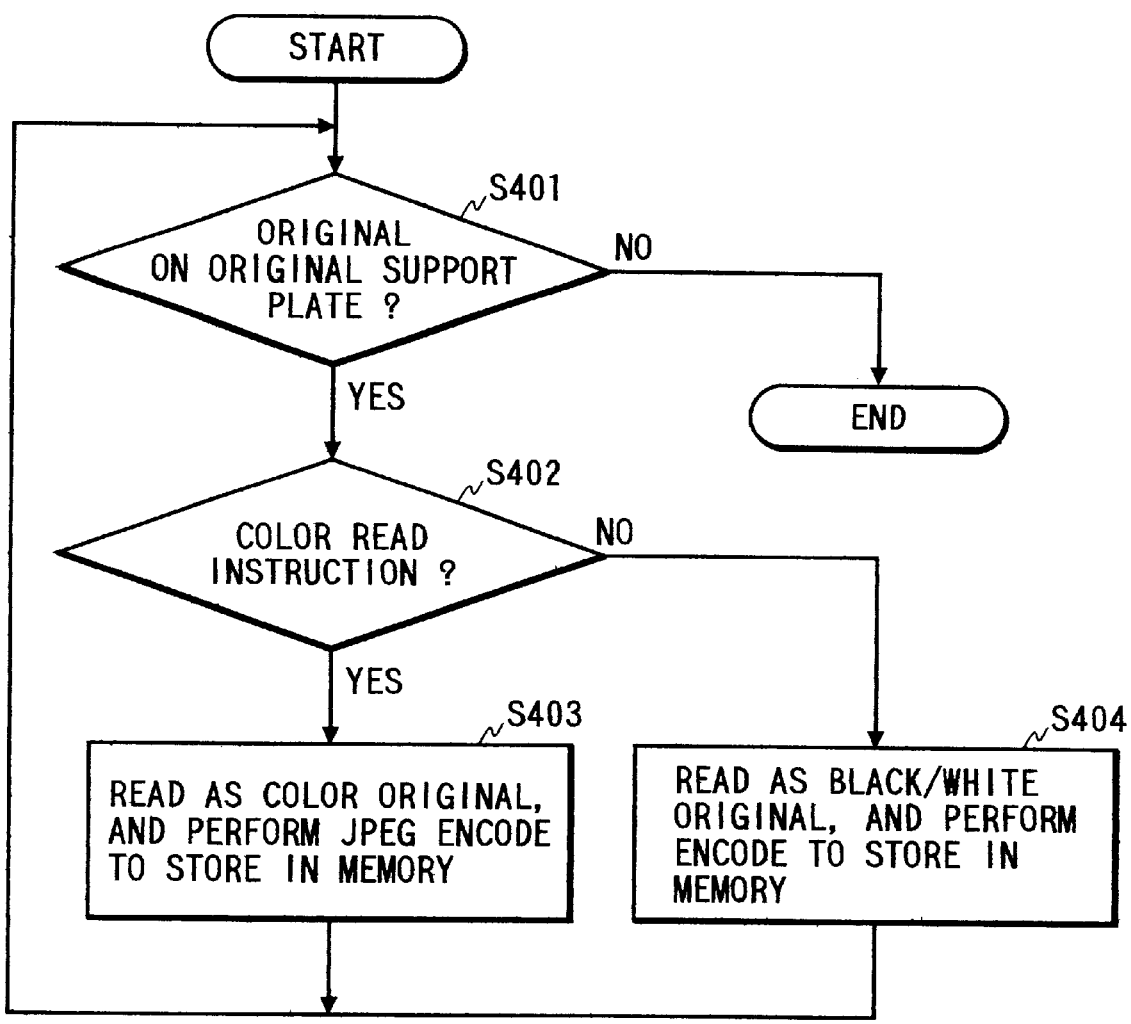
FIG. 5 is a flow chart showing a read process in a memory transmission in the one embodiment.

FIG. 5 is a flow chart showing an operation of the memory transmission in the present embodiment.

When the start key 2-4 is depressed in a memory transmission mode, it is checked in a step S401 whether or not there is the original on the original support plate. If it is judged there is the original on the original support plate, it is further checked in a step S402 whether or not the color key 2-6 is being depressed for each page, i.e., whether or not the lamp in the key 2-6 is being turned on. Therefore, it is checked whether or not the operator instructs to read the original as the color original.

If it is instructed to read the original as the color original, the original is read as the color original and JPEG encoded to store obtained data in the image memory 1-9, in a step S403.

If it is not instructed to read the original as the color original, the original is read as the black/white original and binary encoded to store obtained data in the image memory 1-9, in a step S404. It should be noted that the above storage process is switched or changed on each page during one communication.

Figure 6:
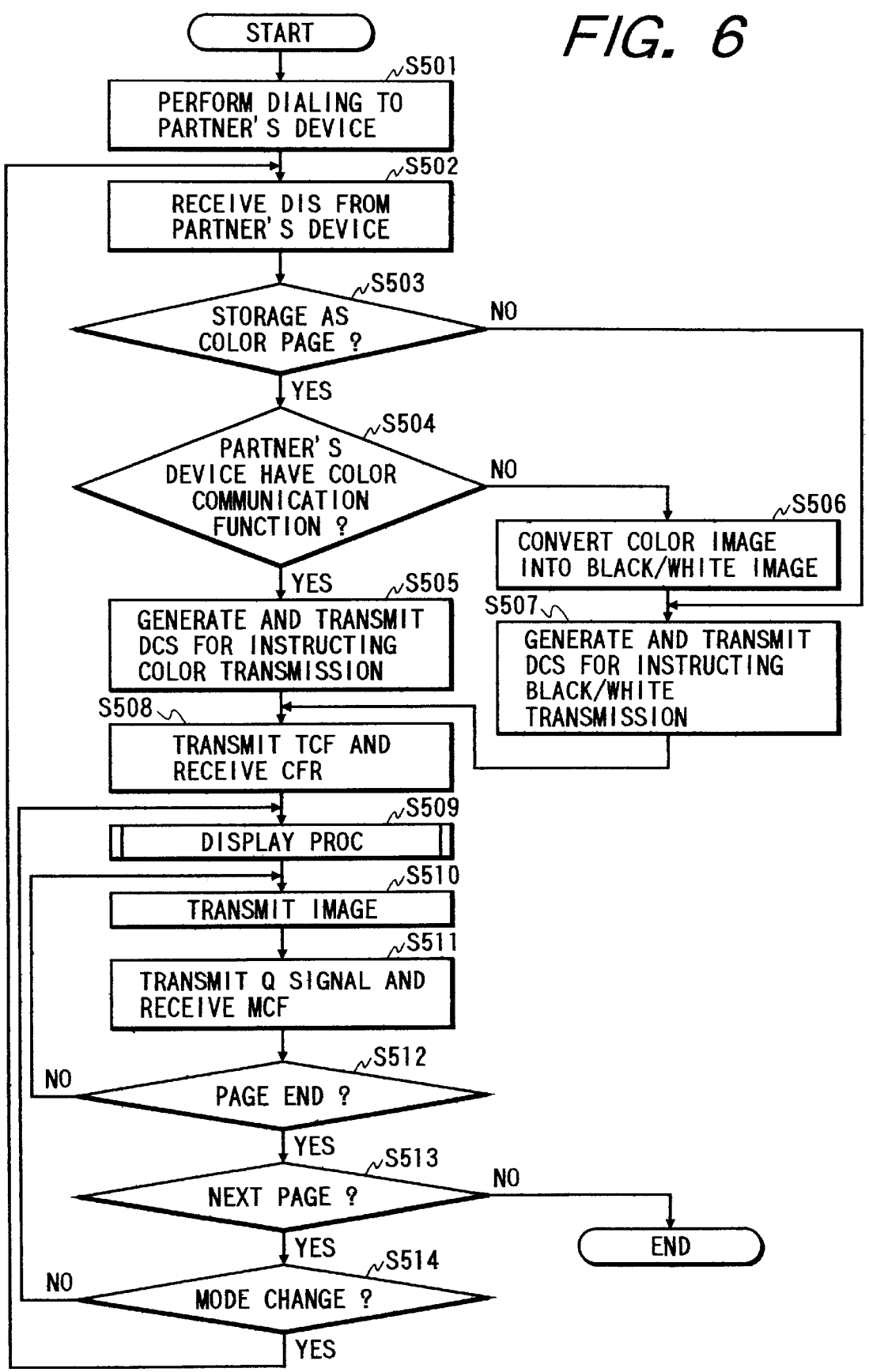
FIG. 6 is a flow chart showing a transmission process in the memory transmission in the one embodiment.

FIG. 6 is a flow chart showing a transmission process in the memory transmission.

In a step S501, the dialing is performed to the partner's device via the modem unit 1-5 and the NCU 1-6. Then, in a step S502, the DIS is received from the partner's device. The DIS includes the information representing the function of the partner's device. In this case, the function includes a function as to whether or not the partner's device can perform the color communication.

In a step S503, it is checked whether or not the page to be next transmitted has been stored as the color page. Namely, it is checked whether such a storage was performed in the step S403 or S404 (FIG. 5).

If it is judged in the step S503 that the page has not been stored as the color page, the page to be next transmitted represents the black/white image. Therefore, in a step S507, the DCS for instructing the black/white transmission is generated and transmitted.

On the other hand, if it is judged in the step S503 that the page has been stored as the color page, it is further checked in a step S504 whether or not the DIS received in the step S502 includes the declaration that the partner's device has the color communication function. If there is no declaration, the color original cannot be transmitted. Therefore, in a step S506, the JPEG-encoded color image is converted into the black/white binary image. Successively, in the step S507, the DCS for instructing the black/white transmission is generated and transmitted.

If it is judged in the step S504 there is the declaration that the partner's device has the color communication function, in a step S505, the DCS for instructing the color transmission is generated and transmitted.

After transmitting the DCS in the step S505 or S507, the TCF is transmitted in a step S508. If the partner's device can correctly or normally receive the TCF, the CFR is received form the partner's device. The signal transmission/reception to/from the partner's device is performed according to the communication control program in the ROM 1-2.

Then, the various information set in the above manner are displayed in a step S509. Then, in a step S510, the image data is transmitted. In this case, if the ECM procedure in T.30 is used, the data of 64 Kbyte is transmitted.

When the image transmission terminates, the Q signal is transmitted in a step S511. If the image data transmitted in the step S510 was correctly or normally received by the partner's device, the MCF is received from the partner's device.

It is checked in a step S512 whether or not the image corresponding to one page is entirely transmitted. If not in the step S512, the flow returns to the step S510 to perform the transmission process of the remaining image. On the other hand, if yes in the step S512, it is further checked in a step S513 whether or not there is the next page in the memory.

If it is judged there is no next page, the process terminates. On the other hand, if it is judged there is the next page, it is checked in a step S514 whether or not the mode change (the resolution, the paper size, the color/monochrome or the like) is instructed. If it is judged that the mode change is instructed, the flow returns to the step S502 to receive the DIS from the partner's device. On the other hand, if it is judged that the mode change is not instructed, the flow returns to the step S509 to perform a data transfer of the next page.

Figure 7:
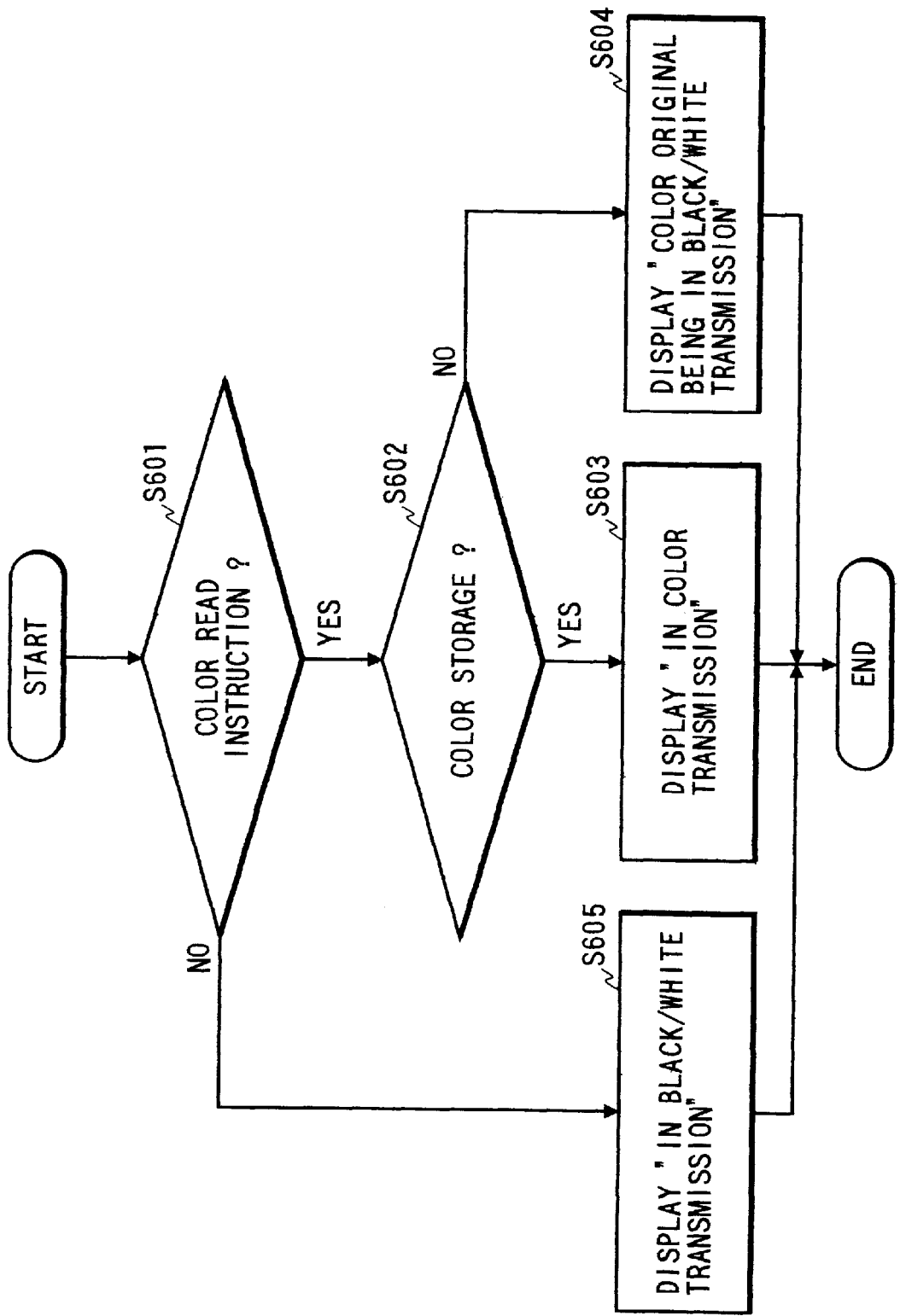
FIG. 7 is a flow chart showing a display process in the direct transmission.

FIG. 7 is a flow chart showing an operation of the display process in the step S312 in the direct transmission mode.

In this process, it is checked in a step S601 whether or not the original is instructed to be read as the color original. If not instructed, in a step S605, it is displayed on the LCD unit 2-2 that the black/white transmission is being performed, and then the process terminates. In this case, if the black/white transmission is considered as "default", such a display as in the step S605 may be unnecessary. On the other hand, if instructed, it is further checked in a step S602 whether or not the encode mode is the JPEG mode.

If judged as the JPEG mode, the color transmission is being performed. Therefore, in a step S603, it is displayed on the LCD unit 2-2 that the color transmission is being performed, to notify such a fact to the operator. On the other hand, if not judged as the JPEG mode, the original is transmitted as the black/white binary original even though the color transmission is instructed. Therefore, in a step S604, it is displayed on the LCD unit 2-2 that the color original is being transmitted as the black/white original, to notify such a fact to the operator.

Figure 8:
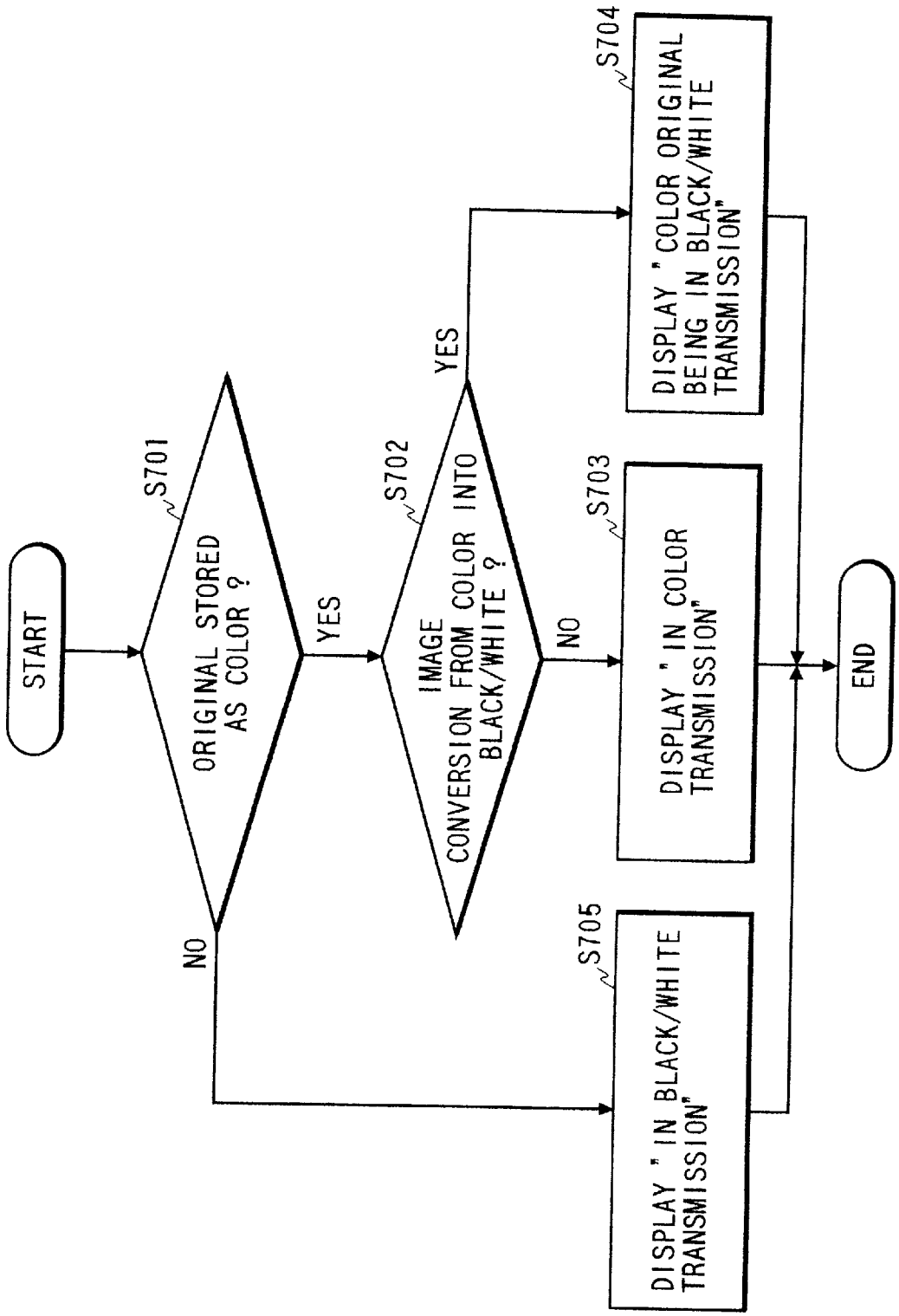
FIG. 8 is a flow chart showing a display process in the memory transmission.

FIG. 8 is a flow chart showing an operation of the display process in the step S509 in the memory transmission mode.

In this process, it is checked in a step S701 whether or not the page to be transmitted was stored as the color page when reading it. In other words, it is checked whether or not the color reading was instructed by the operator when reading the original. If the page is not stored as the color page, in a step S705, it is displayed on the LCD unit 2-2 that the black/white original is being transmitted, and then the process terminates. In this case, if the transmission of the black/white original is considered as "default", such a display as in the step S705 may be unnecessary.

On the other hand, if stored as the color page, it is checked in a step S702 whether or not the color image stored as the color page and then JPEG encoded is converted into the black/white binary image. If not converted, the color transmission is being performed. Therefore, in a step S703, it is displayed on the LCD unit 2-2 that the color original is being transmitted, to notify such a fact to the operator. On the other hand, if converted, the color original is transmitted as the black/white binary original even though the color transmission is being instructed. Therefore, in a step S704, it is displayed on the LCD unit 2-2 that the color original is being transmitted as the black/white original, to notify such a fact to the operator.

FIG. 9 is a view showing an example of the display in the step S603 or S703. Such contents are displayed on the LCD unit 2-2 to notify to the operator that the color original is being transmitted.

FIG. 10A is a view showing an example of the display in the step S604 or S705, and FIG. 10B is a view showing the display in the step S704. Such contents are displayed on the LCD unit 2-2 to notify to the operator that, although the color transmission has been instructed, the color original is being transmitted actually as the black/white original. It should be noted that the above display processes can be switched or change on each page, whereby the operator can confirm whether or not the transmission state of the original is suitable for his intention.

It should be noted that, in the above embodiment, although the color original is encoded in the JPEG encoded method and the black/white (monochrome) original is encoded in the MH method, the present invention is not limited to them. That is, the color original may be encoded in a run-length encode method such as MH method, MR method or the like, and the black/white (monochrome) original may be encoded in MR encode method, JBIG (Joint Bi-level Image expert Group) method or the like.

(Modifications)

It will be explained hereinafter modifications of the above embodiment.

Figure 11:
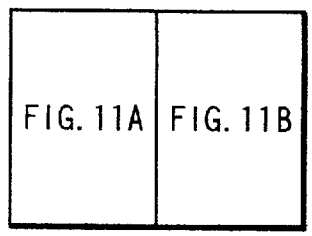
FIG. 11 which is composed of FIGS. 11A and 11B is a flow chart showing an operation of a direct transmission in a modification of the embodiment shown in FIG. 3.
Figure 11A:
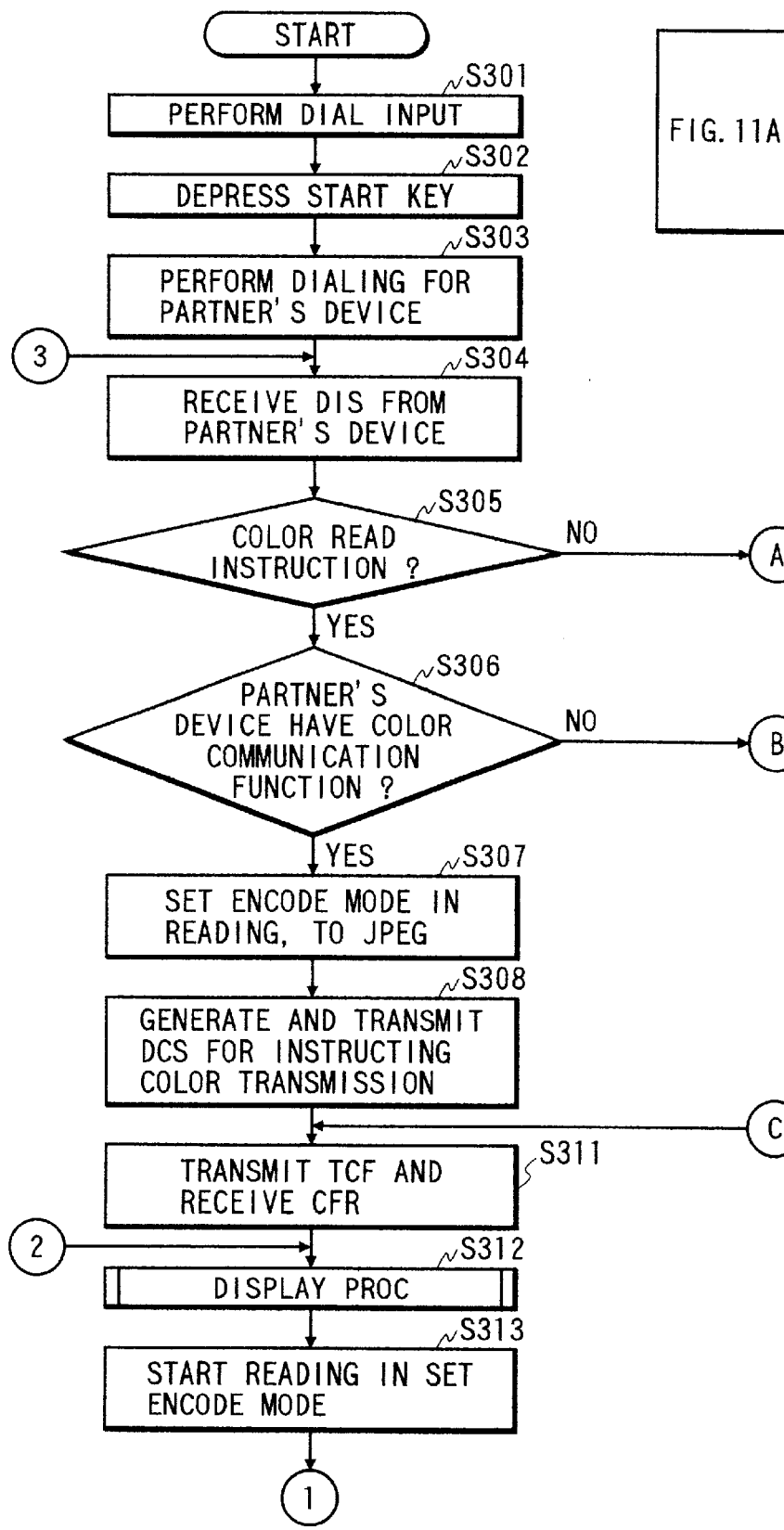
Figure 11B:
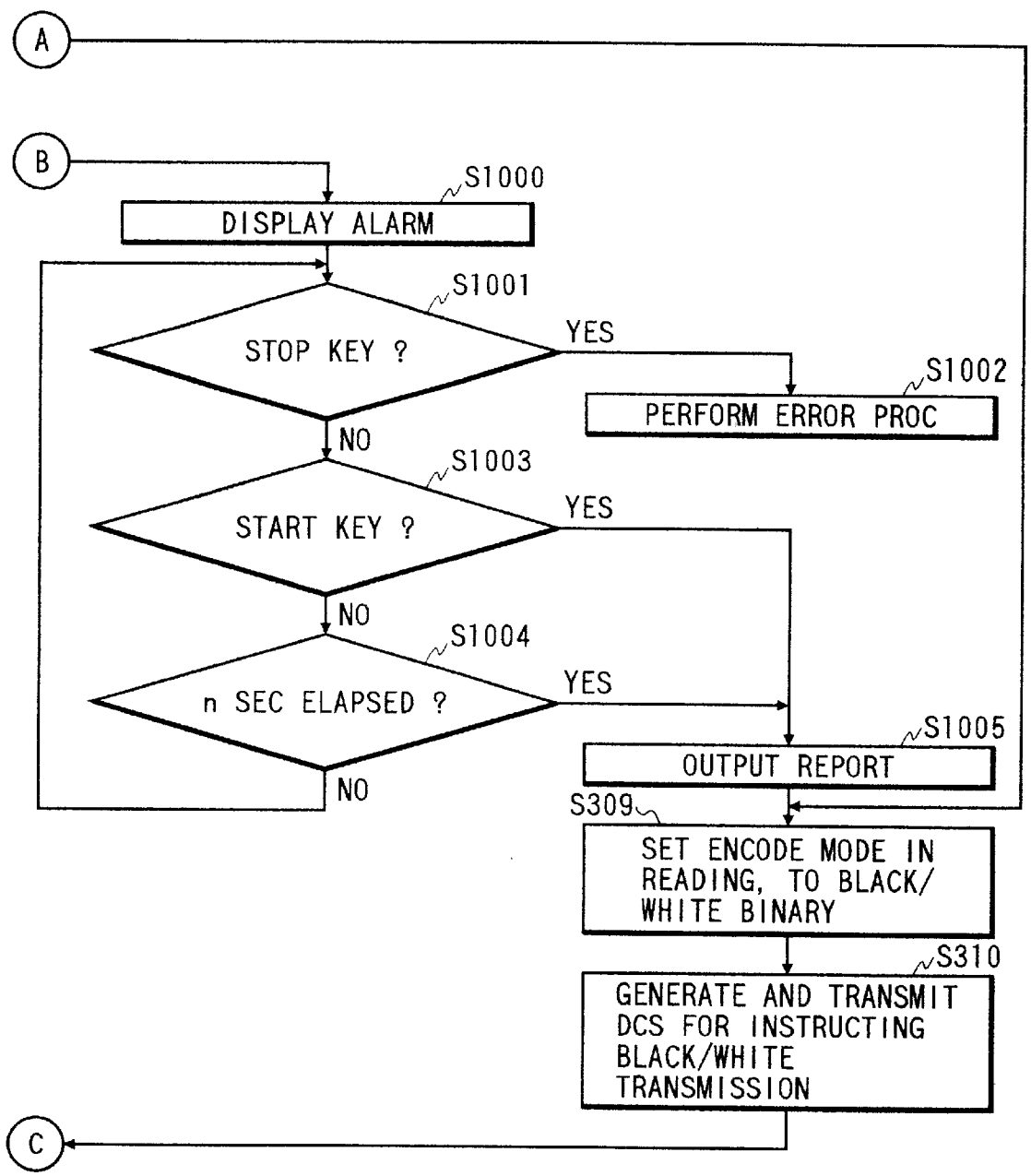

As a first modification, the direct transmission explained in FIG. 3 will be explained in FIGS. 11A and 11B, with reference to FIG. 3.

In the communication process of the first modification, it should be noted that explanation of the part same as in that in FIG. 3 is omitted, and only the part which is specific in this modification will be explained. In FIG. 3, in the case where it is confirmed in the step S305 that the color reading is instructed by the operator and it is judged in the step S306 that the partner's device does not have the color communication function, the flow directly advances to the step S309 to read the original as the black/white (monochrome) image. On the other hand, it is featured in the first modification that the flow advances to the step S309 after confirming the operator's intention. That is, if the operator wishes to transmit the original to the partner as the color image but does not wish to transmit it as the black/white image, it is necessary to confirm to the operator whether or not the original may be transmitted as the black/white image even though the color transmission has been designated.

It will be explained hereinafter the specific feature of the first modification. If it is judged in the step S306 (FIG. 11A) that the partner's device does not have the color communication function, the flow advances to a step S1000 to display on the LCD unit 2-2 a message "although the color original is read as the black/white original to be transmitted as the black/white data, can you accept?". The operator reads this message and then depresses the stop key 2-5 or the start key 2-4 in FIG. 2. If the stop key 2-5 is depressed in a step S1001, the flow advances to a step S1002 to perform the data process. Concretely, the data process disconnects the communication and displays on the LCD unit 2-2 a message "transmission error". If the start key 2-4 is depressed in a step S1003, the flow advances to a step S1005 to print out, as a communication management report, a report on which a message "the color original was read as the black/white original and transmitted as the black/white data" is printed. After the process in the step S1005, the flow advances to the step S309 to read the original as the black/white original. The following processes are the same as those in FIG. 3. After such an alarm message is displayed in the step S1000, if the stop key 2-5 or the start key 2-4 is not depressed during a period of n (about 5 to 20) seconds, it is judged in a step S1004 that the operator does not stand nearby the apparatus. Therefore, the flow automatically advances to the step S1005 to output the report. By reading this report, the operator can confirm that the color original was transmitted as the black/white image. According to the first modification, if the operator wishes to transmit the color original only as the color image, it can be prevented such wasteful communication as the color original is transmitted as the black/white image.

Figure 12B:
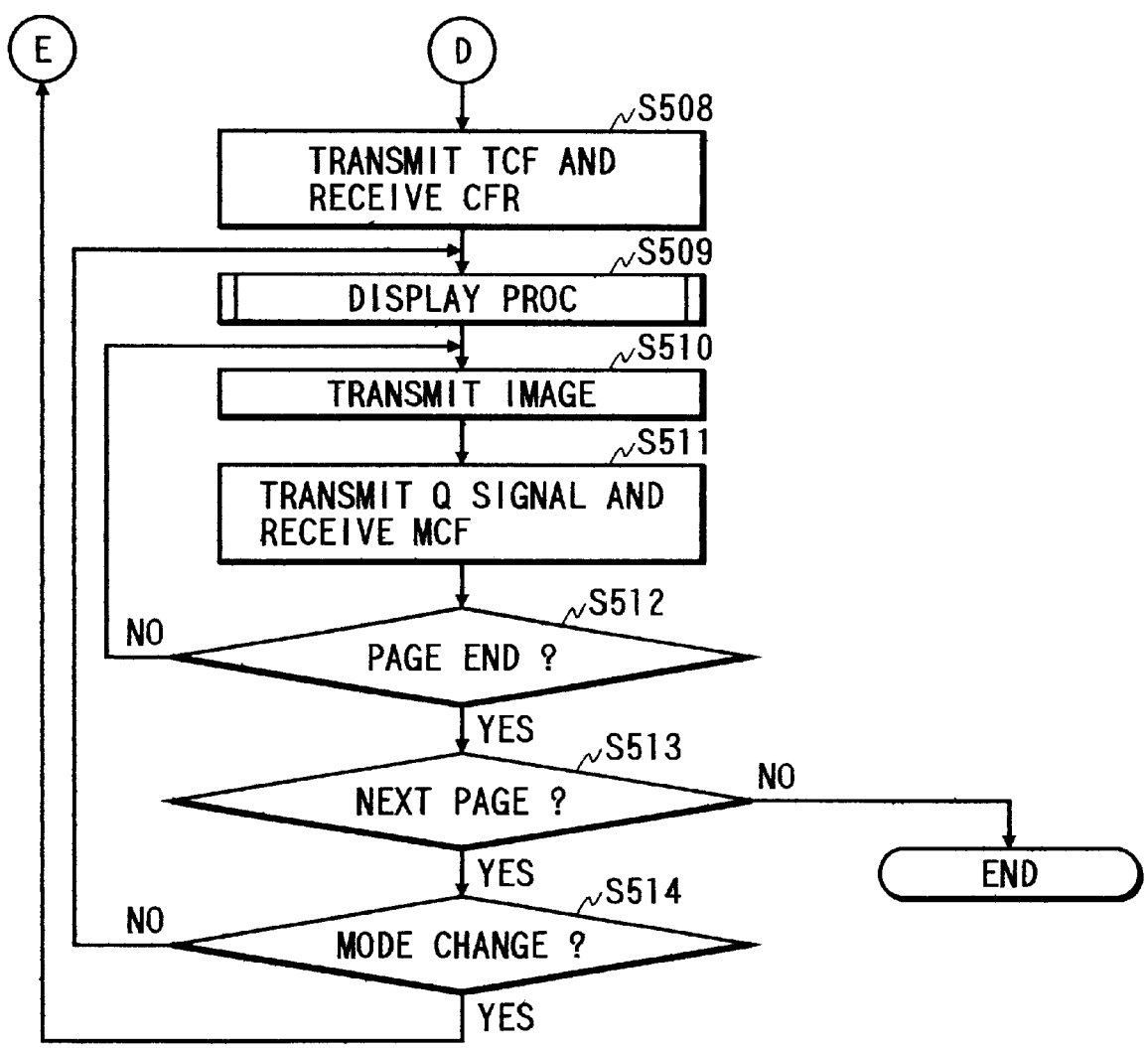
FIG. 12 which is composed of FIGS. 12A and 12B is a flow chart showing a transmission process in a memory transmission in a modification of the one embodiment shown in FIG. 6.

As a second modification, the memory transmission explained in FIG. 6 will be explained in FIGS. 12A and 12B, with reference to FIG. 6.

In the communication process of the second communication, it should be noted that explanation of the part same as in that in FIG. 6 is omitted, and only the part which is specific in this modification will be explained. In FIG. 6, in the case where it is confirmed in the step S503 that the color reading is instructed by the operator (i.e., the original has been stored in the memory as the color page) and it is judged in the step S504 that the partner's device does not have the color communication function, the flow directly advances to the step S506 to convert the color image data into the black/white (monochrome) image data. On the other hand, it is featured in the second modification that the flow advances to the step S506 after confirming the operator's intention.

It will be explained hereinafter the specific feature of the second modification. If it is judged in the step S504 (FIG. 12A) that the partner's device does not have the color communication function, then the flow advances to a step S1100 to display on the LCD unit 2-2 a message "although the color original is transmitted as the black/white image, can you accept?". The operator reads this message and then depresses the stop key 2-5 or the start key 2-4 in FIG. 2. If the stop key 2-5 is depressed in a step S1101, the flow advances to a step S1102 to perform the error process. Concretely, the error process disconnects the communication and displays on the LCD unit 2-2 a message "transmission error". If the start key 2-4 is depressed in a step S1103, the flow advances to a step S1105 to print out, as a communication management report, a report on which a message "the color original was transmitted as the black/white image" is printed. After the process in the step S1105, the flow advances to the step S506 to convert the color image data into the black/white image data. The following processes are the same as those in FIG. 6. After such an alarm message is displayed in the step S1100, if the stop key 2-5 or the start key 2-4 is not depressed during a period of n (about 5 to 20) seconds, it is judged in a step S1104 that the operator does not stand nearby the apparatus. Therefore, the flow automatically advances to the step S1105 to output the report. By reading this report, the operator can confirm that the color original was transmitted as the black/white image. Also, according to the second modification, same as in the first modification, if the operator wishes to transmit the color original only as the color image, it can be prevented such wasteful communication as the color original is transmitted as the black/white image.

In the above first or second modification, instead of the communication management report in the step S1005 or S1105, the same contents may be displayed by using a display device or the like.

The present invention in the above embodiments may be applied to a color communication system which consists of a plurality of devices (e.g., host computer, interface, color reader, color printer and the like), or to a device which consists of a single device (e.g., color facsimile device).

In order to realize the functions in the above embodiments by operating the various devices, a program code of software to be used for realizing the above functions may be supplied to equipments connected to the above various devices or to a computer in the system, so as to operates the devices or the computer (e.g., CPU or MPU) in the system in accordance with the stored program code. Also, such an operation is included in the category of the present invention.

In this case, since the program code of software itself realizes the functions in the above embodiments, the program code itself and a means, e.g., a storage medium storing such the program code, for supplying the program code to the computer all constitute the present invention.

As the storage medium which can store the program code, e.g., floppy disk, hard disk, optical disk, optomagnetic disk, CR-ROM, magnetic tape, non-volatile memory cart, ROM and the like can be used.

Further, when the computer executes the supplied program code, the functions in the above embodiments can be realized. In addition, when the program code is co-operated with an operating system (OS), other application softwares or the like in the computer, the functions in the above embodiments can also be realized. In this case, the program code is of course included in the category of the present invention.

Furthermore, after the supplied program code is stored in a memory provided on a function expansion board of computer or a function expansion unit connected to computer, a CPU or the like which is provided in the function expansion board or the function expansion unit can perform whole or part of actual processes on the basis of an instruction from the stored program code, so as to realize the functions in the above embodiments. Such an operation is also included in the category of the present invention.

As explained above, according to the present invention, in the case where the original is transmitted as the color image, it can be selected from the two operation, one for reading the original as the color image data and the other for reading the original as the black/white (monochrome) image data, in accordance with the discrimination result as to the reception function of the partner's device. Therefore, an appropriate process can be performed in accordance with the color communication function of the partner's device. In addition, since the original reading is not performed until the reception function of the partner's device is discriminated, a wasteful image data process can be eliminated.

Further, according to the present invention, in the case where the color original is transmitted as the color image, even if the color original is transmitted as the black/white image for some reason or other at the partner's device side, the operator can confirm by the predetermined display means that the color original has been transmitted as the black/white image. Therefore, the operator can again transmit the color original as the color image or send the color original by mail.

Furthermore, according to the present invention, in the case where the color original is intended to be transmitted as the color image, it can be designated whether the color original is transmitted as the color image or the black/white image, on each page of the original to be transmitted within one communication. In addition, even if the partner's device does not have the color reception function, it can be eliminated the trouble that the original is read plural times to be transmitted to at least one of the pages.

The present invention has been explained by the preferred embodiments thereof, but the present invention is by no means limited to such the embodiments and is subjected to various further modifications with the scope and spirit of the appended claims.

What is claimed is:

1. A color communication apparatus capable of transmitting a plurality of originals directly to a partner's device by a first mode for transmitting an original as a color image and a second mode for transmitting an original as a monochrome image, comprising:

reading means for reading the plurality of originals and generating either one of color image data and monochrome image data;

transmitting means for transmitting the color image data by the first mode and transmitting the monochrome image data by the second mode; and switching means for manually switching, while said reading means reads, among the plurality of originals, originals precedent to a target original for which mode switching is to be performed, between the first mode and the second mode for the target original.

2. An apparatus according to claim 1, wherein a mode change by said designating means becomes effective after a next page.

3. An apparatus according to claim 1, further comprising displaying means for displaying the mode that is being designated.

4. A color communication method capable of transmitting a plurality of originals directly to a partner's device by a first mode for transmitting an original as a color image and a second mode for transmitting an original as a monochrome image, comprising:

a reading step, of reading the plurality of originals and generating either one of color image data and monochrome image data;

a transmitting step, of transmitting the color image data by the first mode and transmitting the monochrome image data by the second mode; and a switching step, of manually switching, while, reading, among the plurality of originals, originals precedent to a target original for which mode switching is to be performed, between the first mode and the second mode for the target original.

5. A method according to claim 4, wherein a mode change in said designating step becomes effective after a next page.

6. A method according to claim 4, further comprising a displaying step, of displaying the mode that is being designated.

* * * * *

UNITED STATES PATENT AND TRADEMARK OFFICE
CERTIFICATE OF CORRECTION

PATENT NO. : 6,278,529 B1  
DATED : August 21, 2001  
INVENTOR(S) : Naoto Akimoto Page 1 of 1

It is certified that error appears in the above-identified patent and that said Letters Patent is hereby corrected as shown below:

Column 1,
Line 27, "it must be performed" should be deleted.

Column 4,
Line 8, "a" should be deleted.

Column 7,
Line 25, "form" should read -- from --.

Column 11,
Line 6, "operation," should read -- operations, --.

Signed and Sealed this

Fifth Day of March, 2002

*Attest:*

JAMES E. ROGAN  
*Director of the United States Patent and Trademark Office*

*Attesting Officer*